Figure 1:
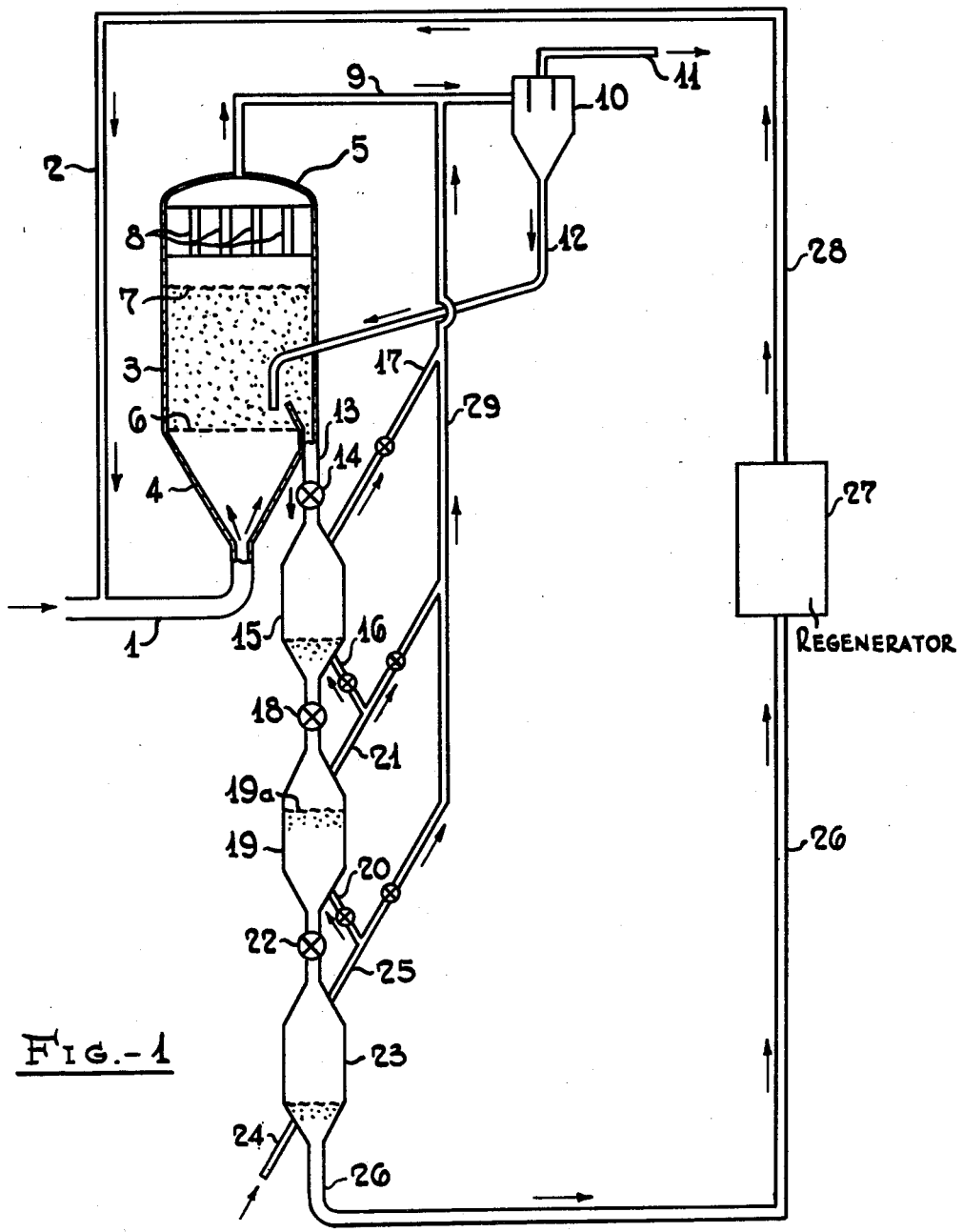

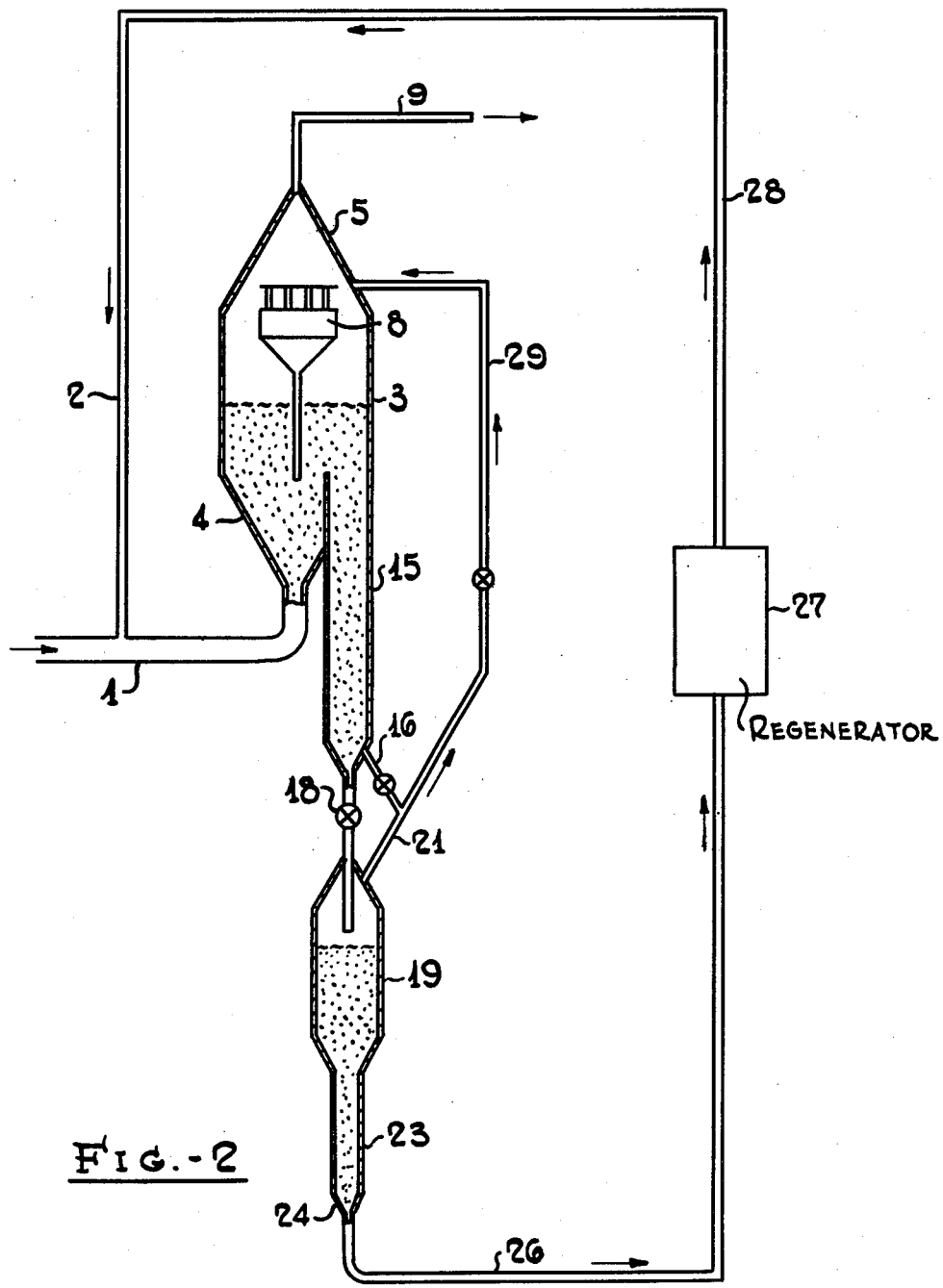

Patented Dec. 18, 1945

2,391,336

UNITED STATES PATENT OFFICE 2,391,336

PETROLEUM CONVERSION PROCESS

Henry J. Ogorzaly, Summit, N. J., assignor to Standard Oil Development Company, a corporation of Delaware Application July 27, 1944, Serial No. 546,801

10 Claims. (Cl. 196—52)

The present invention relates to the art of catalytic hydrocarbon conversion processes such as catalytic cracking, reforming, hydroforming and the like, and more specifically to an improved method for conducting the process so as to increase the yields and reduce wasteful coke formation. The invention will be understood from the following specification and the drawings which disclose one means for carrying out the process.

In the drawings,

Fig. 1 is an elevation of an apparatus useful for catalytic cracking or other conversion processes, showing the reaction vessel in detail and associated equipment for carrying out the present improvements, and Fig. 2 shows an alternate arrangement of the purging or stripping steps.

During the last few years, the technique of employing finely divided solids in a "fluidized" condition for carrying out hydrocarbon conversion processes, such as catalytic cracking, has become quite important in the petroleum industry. In such processes, the catalyst is employed in a finely divided condition and is suspended in the hydrocarbon reactant vapors or in another gaseous vehicle so that a dense suspension which is capable of flowing through the apparatus, much like liquid, is employed. There are generally two separate and distinct steps in the complete conversion process. In the first of these, the hydrocarbon is converted by means of the catalyst, and in this stage the catalyst accumulates a deposit of coky material. The second stage of the operation comprises the regeneration of the catalyst, after the bulk of the hydrocarbon vapors has been separated therefrom, by combustion with air to remove the accumulated carbon deposit. The catalyst is thus returned to substantially its original activity and is reemployed for further conversion.

The deposition of carbon is in part desirable since thereby an increase in the hydrogen content of the recovered oil is achieved and in addition, the burning of the carbon can be made to furnish the heat required in the process. However, in most cases more carbon is deposited than is actually required for these purposes, and since this excess carbon is an unnecessarily degraded product, efforts have been made to reduce its production. A study of this subject has shown that the catalyst, while in a fluidized stream as it is freshly withdrawn from the reaction or conversion vessel, contains hydrocarbon constituents and that by proper provision for removing the bulk of these materials, first, the yield of oil can be increased and secondly, investment in expensive equipment for the combustion of excessive coke can be materially reduced or eliminated.

Referring to Fig. 1, numeral 1 denotes a feed line into which hydrocarbons to be converted by catalytic cracking are fed either in liquid or vapor form. Hot regenerated catalyst flowing in a fluidized condition enters by line 2 and the mixture of the oil and the hot catalyst passes into the reaction vessel which is shown in the form of an upright, cylindrical shell 3, fitted with heads 4 and 5. The mixture preferably enters the vessel below a distribution grid or screen 6 and the velocity in this zone is such as to maintain the catalyst in the fluidized condition.

It will be understood that in the vessel, the hydrocarbon vapors and the dense catalyst particles make up an ebullient mass or cloud-like suspension in rapid movement. In appearance this mass resembles a boiling liquid even to the presence of what appears to be an upper surface or interface which is generally indicated at 7 between a denser lower layer and a less dense upper layer. This level can be controlled by the relative rates of inflow and withdrawal of catalyst which is drawn off by pipes much in the same manner as liquid. In the upper part of the reactor 3, dust separators 8, of cyclonic or centrifugal type, are shown and the vapor, still hot, passes out of a pipe 9 to a secondary separator 10 and thence by the pipe 11 to a condenser and fractionating apparatus which is not shown. The catalyst separated in the initial dust separators 8 is dropped directly into the vessel 3 and that recovered in the secondary separator 10 is returned to the reaction vessel by the pipe 12.

During the conversion process carbon is gradually deposited on the catalyst particles in the form commonly referred to as "coke," which can be removed only by combustion, but in addition incompletely processed hydrocarbon molecules are also adsorbed on the catalytic surface. It is the present purpose to remove the bulk of this adsorbed material as well as all hydrocarbon vapors entrained in the flowing catalyst stream before regeneration.

A stream of the fluidized and partially spent catalyst is withdrawn from the vessel 3 through a pipe 13 which discharges through a valve 14 and into a primary stripping zone 15 which is in the form of a tall narrow cylindrical shell. Gas is introduced by pipe 16 at the bottom of this stripping zone, and as the catalyst passes down through this stripper, hydrocarbons held in the interstices of the catalyst mass as entrained vapor or on the catalyst surface as easily vaporizable compounds, are swept out of the catalyst and removed by the pipe 17.

It has been found that while a large part of the hydrocarbons can thus be removed, there is always a residual quantity of higher boiling materials which are apparently held by adsorption on the catalyst surface and which are not released by this process. For this reason, the catalyst stream is discharged from the bottom of the stripping vessel through a valved pipe 18 and into an enlarged soaking zone 19, wherein the catalyst is maintained for an extended period to effect the decomposition of the heavier, more tightly held hydrocarbon constituents. An agitating gas is also added to the bottom of this zone by pipe 20 so as to maintain the solid catalyst in the fluidized form and to prevent settling out in the vessel 19. This gas passes out at the top of the vessel by pipe 21. On decomposition, these heavier hydrocarbons are reduced in part to solid coke, which of course remains upon the catalyst, and in part to vaporized product which is partly removed by the sweeping action of the fluidizing gas in vessel 19 and later cleaned up by stripping in a secondary stripper 23 into which the catalyst now passes by means of the valved pipe 22. The secondary stripping gas is added by the pipe 24 and after passing through fluidized material in the secondary stripper, passes out by the pipe 25 at the top. It will be observed that if desired, all of the gas employed in these three latter vessels, 15, 19 and 23, may be added through the pipe 24, the gas leaving each of the higher numbered vessels passing in turn into the lower numbered vessel of the series, but if desired additional gas may be added at each vessel. The stripping gas eventually goes by pipe 29 to catalyst separator 10.

The catalyst is finally removed from the secondary stripper 23 in a fluidized stream by the pipe 26. It is then in a substantially dry condition, that is to say, it contains no liquefiable hydrocarbons or strippable materials although the amount of coke on the catalyst has been somewhat increased over what it was on removal from the reaction zone 3. A substantial decrease, however, in combustible content has been effected by the stripping and coking steps. The stream of fluidized catalyst is then conducted to the regenerator which is shown diagrammatically and without detail at 27 and the regenerated catalyst is passed by pipe 28 to the supply pipe 2 which was mentioned before.

The second stage of the present process has for its purpose a secondary decomposition of the difficultly strippable heavy hydrocarbons that remain on the catalyst after the primary stripping and this is accomplished by providing an extended soaking or secondary conversion period. It is preferable to maintain a level in vessel 19, as indicated at 19a, by adjustment of the valve 22 and the time of residence or sojourn may be of the order of 30 seconds to 5 minutes. It will be recalled that the conversion vessel is ordinarily at a temperature above 750° F., so that in the presence of so large an amount of catalyst, the small quantity of retained hydrocarbons is quickly reduced to coke and vaporized products. The vessel may be heated but this is generally not required as the contained heat of the catalyst is adequate for the purpose.

The time of sojourn in this secondary decomposition or soaking zone naturally varies with the particular type of catalyst, its age, and the temperature and pressure levels of operations. The size of the vessel cannot be readily controlled during a particular run, but the time of sojourn can be regulated by adjusting the level in the vessel 19, gradually allowing it to rise during the run. At the start of a run when the catalyst is new, it is of extremely high activity and the time required for the conversion is relatively short. At this stage of the process, the level 19a might well be maintained in the lower third or half of the vessel 19, but as the catalyst gradually becomes older and less active, more time is required for the conversion and the catalyst level can be gradually raised or raised from time to time so that during the end of the run where more time for cracking is required, it might be within the top third of the vessel.

The third stage of the process is a secondary stripping stage similar in all respects to the first or primary stripping stage. This zone again may be operated using either a thin or a dense catalyst dispersion in the stripping zone.

The drawings show these three stages as distinct and separate zones or vessels, one below the other for clarity of description and ease of understanding, but one or more of the zones may be associated or integrated with the others into a single shell without departing from the spirit of the present invention. There are many advantageous arrangements of the vessels but in each case three zones of operation are contemplated, the first for primary stripping, the second for conversion or coking and the third for secondary stripping.

As the stripping medium, that is to say, the gas which is employed to strip hydrocarbons from the catalyst, steam may be employed, but in many cases the catalyst is slowly deactivated by steam and for this reason other inert gases may be used, such as nitrogen, carbon dioxide or combustion gases.

In carrying out the improved process described above, it will be observed that there are three steps or stages: In the first the more readily removable lighter hydrocarbons are stripped from the catalyst by means of a stream of inert gas. The purpose of this step, as stated above, is to remove the entrained vapors and easily strippable hydrocarbons as rapidly as possible and to recover them without further decomposition. The valves (14) and (18) may be so adjusted that the level of the catalyst is maintained at a low point in the stripping vessel (15) so that the catalyst falls through a continuous menstruum of upwardly rising gas. In the stripping the concentration of catalyst in the gas is lower and it may be said that the stripping is accomplished in the "dilute phase."

If desired, the construction may be simplified and certain of the valves eliminated by the use of a stripping unit of the "dense phase" type in which the purging gas rises upward through a substantially continuous menstruum of agitated, downwardly flowing catalyst suspension. Such an installation is pictured in the attached Fig. 2. In the drawing, the reactor is shown as in the prior drawing and the same numbers have been applied where equipment is the same. The primary stripper indicated by 15 is filled directly from the reaction vessel so that the catalyst mixture density is about the same as in the lower part of the reactor, and may be described as "dense" in comparison with the condition of the catalyst in 15 of Fig. 1. No valve is required in pipe 13. The soaker 19 is operated just as its counterpart in Fig. 1 and the catalyst therein is is a dense condition. In the final stripping stage accomplished in 23 of Fig. 2, the catalyst is again in the dense stage as contrasted with the dilute condition employed in as of Fig. 1.

A stripper of the dense phase type may be distinguished from one of the dilute phase type by the absence of a clearly distinguishable catalyst level within the stripping zone and by the significantly greater density of the material in the stripping zone. For example, in a dense phase stripper the density may be of the order of 10–35 lbs. per cubic foot, whereas in a dilute phase stripper, the density above the catalyst level may be about 0.01 to 2 lbs. per cubic foot. When speaking of a dense dispersion and a thin dispersion in the present specification, it will be noted that dispersions of approximately these densities are indicated.

In comparing the apparatus of Fig. 1 with that of Fig. 2, it may be seen that the stripping accomplished in the first equipment is superior but it requires a more complicated apparatus, which is necessarily more costly.

To illustrate more clearly the effect and the potentialities of the present invention, the following example is given:

Experimental studies of operating units have indicated that the catalyst withdrawn from the reaction zone of a fluid catalyst process might contain on the surface or in the vapors associated with it, carbonaceous materials in these amounts.

|   | Percent |
|---|---|
| (1) Volatile hydrocarbons entrained and readily removable by stripping | 0.66 |
| (2) Volatile hydrocarbons difficult to remove by stripping, but capable of decomposition to coke and volatile products | 0.10 |
| (3) Coke removable only by combustion | 0.21 |

From the above it will be noted that (1) represents the hydrocarbons that may be removed in the initial stripping stage. At a weight ratio of catalyst circulation to oil feed of 20 parts per part of oil the yield of cracked products may be increased by proper recovery methods in the primary stripper by 13.2%, based on oil feed.

The product represented by (2) is the material coked on the catalyst in the soaking zone. On coking about 20% by weight of the adsorbed hydrocarbon is converted to true coke deposit on the catalyst and the remainder, consisting of light gases and liquefiable hydrocarbon products is vaporized. These vapors, which, at a catalyst-oil weight ratio of 20 represent about 1.6% on feed, are readily removable by stripping in the secondary stage. The net coke going to the regenerator is by virtue of these steps reduced to about 0.23% on catalyst compared to 0.31% on catalyst remaining after the primary stripping stage, a reduction of 26% in the necessary combustion capacity.

I claim:

1. In a hydrocarbon conversion process in which hydrocarbons are brought into contact in a reaction zone with a finely divided solid contact catalyst which is maintained in a fluidized condition in which the bulk of the hydrocarbons is separated as vapors from the catalyst which is eventually partially fouled with carbon deposits thereon and in which the catalyst is subsequently regenerated in a regeneration zone and reused in the reaction zone for further conversion, the improved steps comprising withdrawing a stream of fluidized partially fouled catalyst from the reaction zone, stripping the catalyst of the more readily removable hydrocarbons associated therewith by means of a current of inert gas in a primary stripping zone, thereafter maintaining the partially stripped fluidized catalyst as a dense dispersion under a temperature suitable for hydrocarbon decomposition for an extended period in a coking zone wherein a substantial portion of the residual hydrocarbons is decomposed to a readily vaporizable product and coke, again stripping the catalyst of vaporizable constituents by means of a current of inert gas in a secondary stripping zone, and conducting the catalyst to the regeneration zone.

2. Process according to claim 1 in which the stripping of the catalyst is accomplished during the downward passage through the stripping zones in counterflow to a current of stripping gas.

3. Process according to claim 1 in which the stripping is accomplished while the catalyst is in a thin dispersion less dense than that withdrawn from the reaction zone.

4. Process according to claim 1 in which the stripping is accomplished during the downward flow through a stripping zone in counterflow to a current of inert gas and the catalyst is thereafter maintained at a coking temperature for a period of one-half to five minutes.

5. Process according to claim 1 in which the stripping steps are accomplished while the catalyst is in a state of thin dispersion and coking is accomplished in a state of dense dispersion.

6. Process according to claim 1 in which an inert gas passes into the secondary stripping zone, thence through the coking zone, and thereafter through the primary stripping zone.

7. Process according to claim 1 in which all of the inert gas enters the secondary stripping zone, passing thence to the coking zone and thereafter through the primary stripping zone.

8. In a hydrocarbon conversion process in which hydrocarbons are brought into contact in a reaction zone with a mass of finely divided solid contact catalyst maintained in a dense fluidized condition, the bulk of hydrocarbon conversion vapor products being separated in the reaction zone from the catalyst that becomes partially fouled by carbon deposits thereon, and the partially fouled catalyst is subsequently regenerated in a regeneration zone for reuse, the improved steps which comprise withdrawing a stream of fluidized partially fouled catalyst from the reaction zone, stripping the withdrawn partially fouled catalyst of readily removable hydrocarbons by means of a current of inert gas in a primary stripping zone, thereafter maintaining the partially fouled catalyst thus partially stripped as a dense fluidized mass of defined level at a temperature suitable for decomposition of residual unstripped hydrocarbons for an extended period in a coking zone until a substantial portion of said residual hydrocarbons is decomposed to a vaporizable product and coke, varying the period that the partially fouled catalyst is maintained in said coking zone a period of ½ to 5 minutes by adjusting the level of the mass of partially fouled catalyst in the coking zone, then stripping said vaporizable product from the partially fouled catalyst by means of a current of inert gas in a secondary stripping zone before conducting the catalyst to the regeneration zone.

9. Process according to claim 8, in which stripped vapors are withdrawn separately from each of said stripping zones.

10. Process according to claim 8 in which stripped vapors are withdrawn separately from each of said stripping zones, and said withdrawn vapors are combined with hydrocarbon conversion vapor products separated in the reaction zone from the catalyst.

HENRY J. OGORZALY.